(12) United States Patent
Roth et al.

(10) Patent No.: US 6,545,750 B2
(45) Date of Patent: Apr. 8, 2003

(54) SYSTEM FOR DETERMINING THE DYNAMIC ORIENTATION OF A VEHICLE WHEEL PLANE

(75) Inventors: Vladimir Roth, Akron, OH (US); David O. Stalnaker, Hartville, OH (US); Stanley J. Olesky, Akron, OH (US); John L. Turner, Akron, OH (US)

(73) Assignee: Bridgestone/Firestone North American Tire, LLC, Nashville, TN (US)

( * ) Notice: Subject to any disclaimer, the term of this patent is extended or adjusted under 35 U.S.C. 154(b) by 0 days.

(21) Appl. No.: 09/758,558

(22) Filed: Jan. 11, 2001

(65) Prior Publication Data

US 2002/0089661 A1 Jul. 11, 2002

(51) Int. Cl.[7] .................. G01B 11/26; G01B 13/18; G01B 21/22; G01B 5/24; G01B 7/30; G01C 1/00
(52) U.S. Cl. ................. 356/139.09; 33/203.16
(58) Field of Search ............. 356/139.09; 33/203, 33/203.16

(56) References Cited

U.S. PATENT DOCUMENTS

| | | | |
|---|---|---|---|
| 2,601,262 A | 6/1952 | Carrigan | 33/46 |
| 3,951,551 A | 4/1976 | Macpherson | 356/155 |
| 4,685,806 A | 8/1987 | Arnberg et al. | 356/376 |
| 4,863,266 A | 9/1989 | Masuko et al. | 356/152 |
| 5,268,731 A | 12/1993 | Fuchiwaki et al. | 356/5 |
| 5,368,260 A | 11/1994 | Izbinsky et al. | 246/169 R |
| 5,532,816 A | 7/1996 | Spann et al. | 356/139.09 |
| 5,532,824 A | 7/1996 | Harvey et al. | 356/375 |
| 5,535,522 A | 7/1996 | Jackson et al. | 33/288 |
| 5,561,244 A | 10/1996 | Olesky et al. | 73/146 |
| 5,600,435 A | 2/1997 | Bartko et al. | 356/139.09 |
| 5,724,128 A | 3/1998 | January | 356/139.09 |
| 5,731,870 A | 3/1998 | Bartko et al. | 356/139.09 |
| 5,781,286 A | 7/1998 | Knestel | 356/139.09 |
| 5,969,246 A | 10/1999 | Jackson et al. | 73/459 |
| 6,400,451 B1 * | 6/2002 | Fukuda et al. | 33/203.18 |

FOREIGN PATENT DOCUMENTS

| | | |
|---|---|---|
| JP | 63117237 | 5/1988 |
| JP | 02270682 | 11/1990 |
| JP | 04213017 | 8/1992 |
| WO | WO 00/71972 | 11/2000 |

* cited by examiner

*Primary Examiner*—Thomas H. Tarcza
*Assistant Examiner*—Brian Andrea
(74) *Attorney, Agent, or Firm*—John M. Vasuta; Cynthia S. Murphy

(57) ABSTRACT

A system (10) for measuring the dynamic orientation of the plane of a wheel (12) on a vehicle (14). The system (10) includes a test surface (16) which rotates with the wheel (12) and a orientation-determining device (18) which is unattached to the vehicle (14). The test surface (16) is positioned in a plane corresponding to the plane of the wheel (12) and the orientation-determining device (18) determines the orientation of the plane of the test surface (12) at a specific point of time while the vehicle is being driven. A processor (20) receives output signals from the orientation-determining device (18) and converts the output signals into data corresponding to the orientation of the wheel plane for the specific instant in time.

13 Claims, 2 Drawing Sheets

SYSTEM FOR DETERMINING THE DYNAMIC ORIENTATION OF A VEHICLE WHEEL PLANE

FIELD OF THE INVENTION

This invention relates generally as indicated to a system for determining the dynamic orientation of a vehicle wheel plane and more particularly to a system wherein off-vehicle measurement equipment is used to determine the orientation of the wheel plane while the vehicle is being driven.

BACKGROUND OF INVENTION

The trend in the tire and automobile industry is to closely match and design a particular tire as original equipment for a particular vehicle. Specifically, automobile manufacturers commonly equip a vehicle with a set of tires which have been found to provide the most desirable wear and ride characteristics for that particular vehicle. To this end, a number of tests are performed on tires to determine their suitability for a specific vehicle. Of particular relevance to the present invention are the tests that are performed to obtain dynamic orientation characteristics of a wheel on which the tire is mounted.

The dynamic orientation of a wheel plane is defined by two angles, namely the inclination angle and the heading angle. The inclination angle relates to the "tilt" of the wheel with respect to the ground and can be defined as the angle between the plane of the wheel and a plane perpendicular to the ground. The heading angle is the angle between a reference direction on the ground and the travel direction of the wheel.

An apparatus for measuring the dynamic inclination angle of a vehicle wheel is disclosed in U.S. Pat. No. 5,561,244. (This patent is assigned to the assignee of the present invention.) The disclosed apparatus includes a bracket non-rotatably mounted to the wheel and extending in horizontal cantilever fashion therefrom. Laser transducers are appropriately mounted on the bracket to emit beams against the road surface and to detect the beams reflecting back from the road surface. Sensors measure the distance from the ground and these measurements are fed through control cables to a computer located within the vehicle. The angular change of the bracket is representative of the change of the inclination angle of the wheel. In this manner, the apparatus obtains the dynamic inclination angles which the wheel experiences as it is driven along an actual road surface on a particular vehicle.

In the apparatus disclosed in U.S. Pat. No. 5,561,244, the measuring equipment (i.e., laser transducers, sensors, etc.) must be mounted to the vehicle, this sometimes sensitive equipment is exposed to the risks of damage due to moving contact and/or reduced accuracy issues. Moreover, the apparatus disclosed in U.S. Pat. No. 5,561,244 cannot measure and/or take into account the heading angle of the wheel since the sensors are moving with the vehicle whereby it cannot determine the dynamic orientation of the wheel plane.

SUMMARY OF THE INVENTION

The present invention provides a system for measuring the dynamic orientation of a wheel plane while the vehicle is being driven but without the need to mount orientation-determining equipment to or on the vehicle. In this manner, orientation measurements can be obtained which correspond to the real-world environment (such as vehicle compliances and driving conditions) while at the same time the measuring equipment is not exposed to the risks or problems associated with on-vehicle mounting. Moreover, the system of the present invention can measure not only the inclination angle but also the heading angle of the wheel whereby the dynamic orientation of the wheel plane can be determined.

More particularly, the system of the present invention comprises a test surface on the vehicle (such as disk secured to the hub of the wheel) and an orientation-determining device unattached to the vehicle. The test surface rotates with the wheel when the vehicle is being driven and is positioned in a plane corresponding to the orientation of the wheel plane. The orientation-determining device, which can be stationary, determines the orientation of the plane of the test surface at a specific point of time while the vehicle is being driven. In this manner, both the inclination angle and the heading angle are taken into account during the measurements and can be used when evaluating the dynamic orientation characteristics of the wheel.

A processor can be provided to receive signals from the orientation-determining device and convert the signals into output data corresponding to the orientation of the wheel plane for the specific point in time. The orientation-determining device can be a device which em its non-collinear beams of energy onto the test surface. For example, the orientation device can comprise at least three transducers which emit respective beams of electromagnetic energy (e.g., laser beams) to three non-collinear points on the test surface and which detect respective beams reflected off of the test surface and thereby determine the distance of each of the three non-collinear points from the device.

To use the system of the present invention, the vehicle is driven (e.g., accelerated, braking, cornering and combinations thereof) past the orientation-determining device and the orientation-determining device is activated to obtain data indicative of the orientation of the plane of the test surface.

The present invention provides these and other features hereinafter fully described and particularly pointed out in the claims, the following description and annexed drawings setting forth in detail a certain illustrative embodiment of the invention, this being indicative, however, of but one of the various ways in which the principles of the invention can be employed.

DRAWINGS

DETAILED DESCRIPTION

Figure 1:
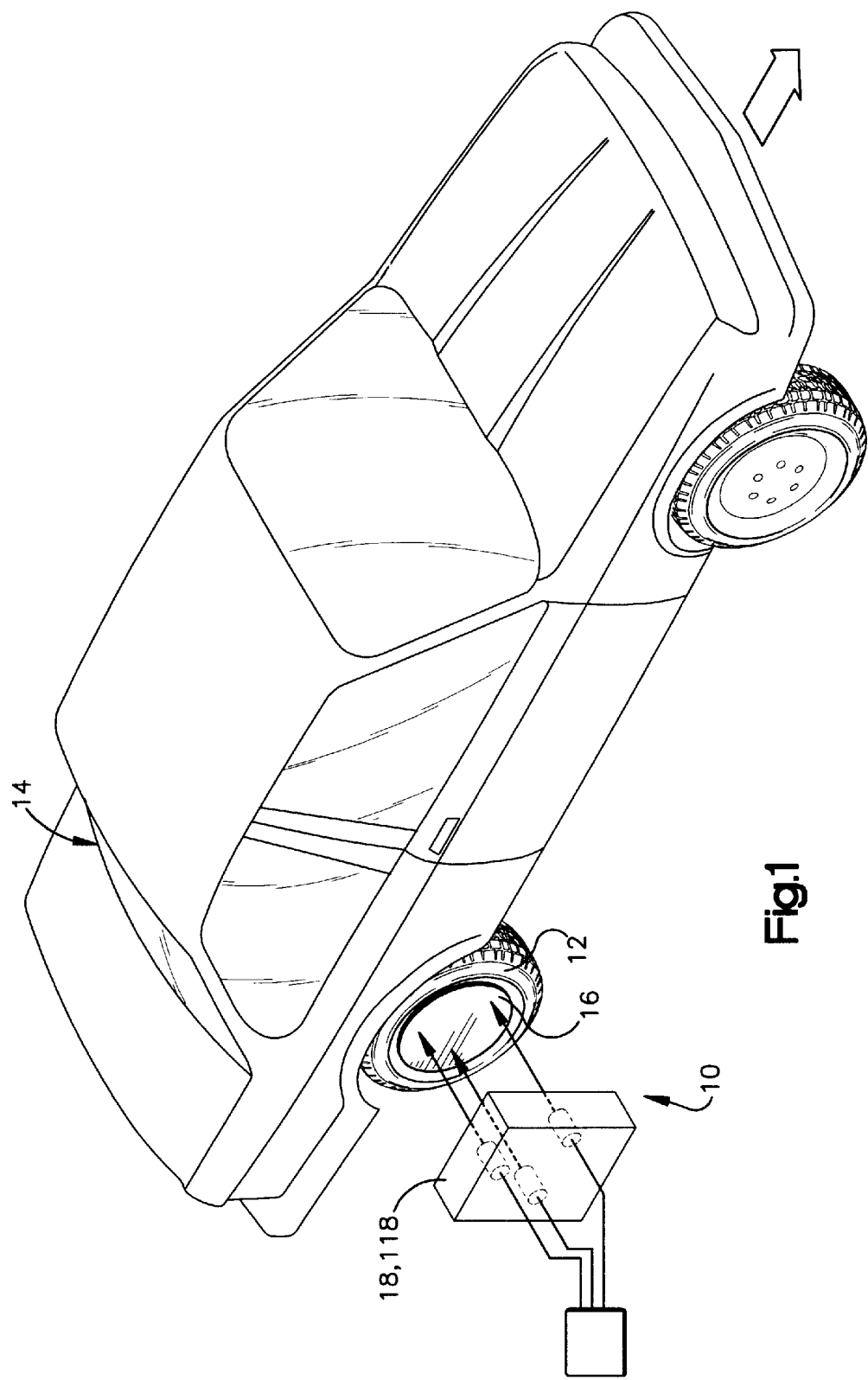
FIG. 1 is a schematic perspective view of a system according to the present invention being used to measure the dynamic orientation of a wheel plane on a moving vehicle, the system including a test surface which rotates with the wheel and an orientation-determining device unattached to the vehicle.

Referring now to the drawings in detail, and initially to FIG. 1, a system 10 for measuring the dynamic orientation of the plane of a wheel 12 on a moving vehicle 14 is schematically shown. The system 10 comprises a test surface 16 mounted to the wheel 12 and an orientation-determining device 18 unattached to the vehicle 14. As the vehicle is being driven, and the wheel 12 is rotated, the orientation of the plane of the test surface 16 will correspond to the orientation of the plane of the wheel 12. The system 10 further comprises a processor 20 which receives signals from the orientation-determining device 18 and converts the signals into output data corresponding to the orientation of the plane of the wheel 12 for the specific instant in time as it passes by the measurement device 18.

Figure 2:
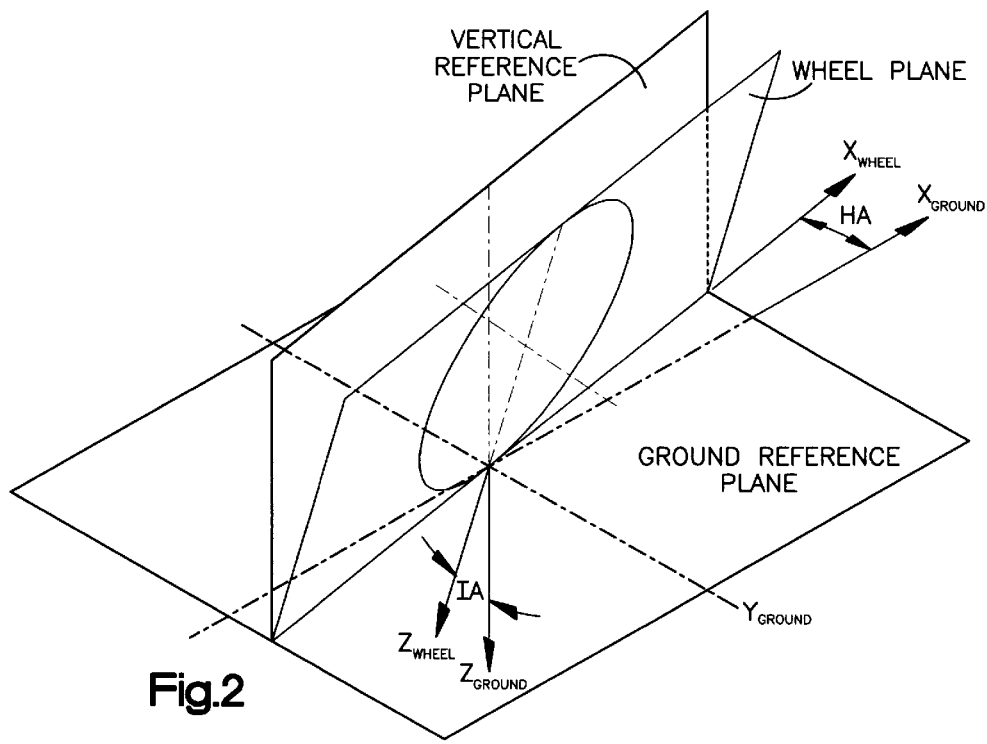
FIG. 2 is a schematic perspective view of the wheel showing the planes and lines relating to the orientation of the wheel plane.

As is best seen in FIG. 2, the orientation of the plane of the wheel 12 is defined by two angles, namely an inclination angle IA and a heading angle HA. The inclination angle IA relates to the "tilt" of the wheels with respect to the ground and can be defined as the angle between the plane of the wheel (or, in the illustrated embodiment, the test surface 16) and a vertical reference plane perpendicular to the ground. The heading angle HA is the angle between a reference direction and the travel direction of the wheel 12. For example, when a horizontal ground reference plane is used, it will have horizontal axes $X_{ground}$ and $Y_{ground}$, and vertical axis $Z_{ground}$ extending upward/downward from the intersection of the axes $X_{ground}$ and $Y_{ground}$. The orientation plane of the wheel has axes $X_{wheel}$ and $Z_{wheel}$. The vertical reference plane is defined by axes $X_{wheel}$ and $Z_{ground}$ and the inclination angle IA is the angular difference between $Z_{wheel}$ and $Z_{ground}$. The $X_{ground}$ axis is the reference direction and the heading angle HA is the angular difference between $X_{ground}$ and $X_{wheel}$.

The test surface 16 preferably comprises a disk-shaped member that is suitably secured to the wheel 12. If the orientation-determining device 18 employs laser beams, the test surface 16 should have.a suitable surface for reflecting the laser beams. That being said, a separate test surface 16 can not be necessary in that the wheel's standard hub could instead constitute the test surface 16 in certain circumstances.

Figure 3:
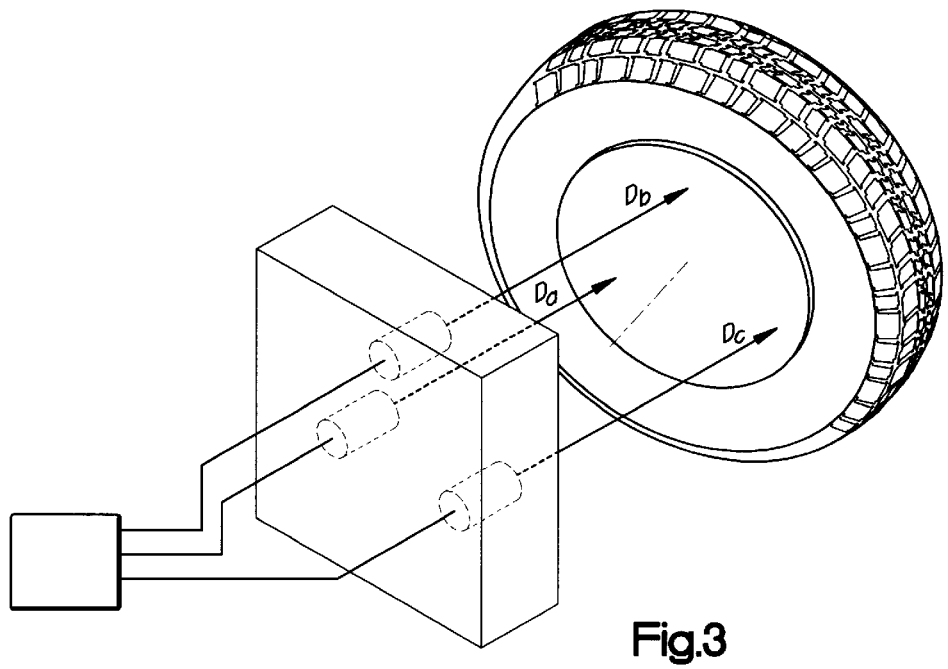
FIG. 3 is a schematic side view of the test surface and the orientation-determining device.

Referring now to FIG. 3, the test surface 16 and the orientation-determining device 18 are schematically shown. The orientation-determining device 18 comprises three transducers 30a, 30b, and 30c, each of which includes an emitter for emitting beams of electromagnetic energy to three non-collinear points on the test surface 16 and a sensor for detecting the beams reflected off of the test surface 16. Preferably, the transducers 30 are relatively high speed laser units. For example, one type of laser unit found suitable for the present invention is a Model LB-70/LB-11 or LB-72/LB-12 made by Keyence Corporation. However, other types of laser units, and other types of transducers for producing various beams of energy (such as sonic devices, infrared devices, etc.) can be possible with, and are contemplated by, the present invention.

During operation of the system 10, the transducers 30 produce output signals corresponding to the distances $D_a$, $D_b$, and $D_c$ between the test surface 16 and the orientation-determining device 18 and these output signals are conveyed to the processor 20. Based on the measured distances, the processor 20 determines the orientation of the plane of the test surface 16, as by using any well known triangulation algorithm.

In the illustrated embodiment, the test surface 16 is planar and mounted so that the orientation of its plane is the same as that of the wheel 12. Also, in the illustrated embodiment, the device 18 is shown located so that its transducers 30 emit aligned beams in a normal direction relative to the test surface 16 However, non-parallel geometric arrangements between the test surface 16 and the wheel 12, non-normal locations of the device 18 relative to the test surface 16, and/or nonaligned transducers 30 are possible with, and contemplated by, the present invention. The system 10 can be programmed to compensate for these and other different relationships when calculating the orientation of the wheel plane.

The system 10 can be used to repeatedly test wheels. Alternatively, once the orientation of the wheel planes are determined for a particular road surface and/or a particular vehicle, this data can be stored and reused in a test facility for testing other wheels or tires in a controlled environment. Specifically, the stored data allows subsequent test tires to be imposed with actual orientations which the tires would experience when used with a particular vehicle and/or under actual road operating conditions.

It can now be appreciated that the test surface 16 does not include any of the system's electronic components and merely functions as a reflecting surface during the testing operation. Also, the orientation-determining device 18 and the processor 20 preferably remain stationary during operation of the system 10 thereby protecting the system's electronic equipment from the risks encountered when attached to a moving vehicle. (However, it is possible to position the orientation-determining device 18 and/or the processor 20 so as to also move during operation of the system 10 if necessary or desired for a particular purpose.) Furthermore, the system 10 can provide information regarding the actual orientation of the wheel plane because it takes into account both the inclination angle IA and the heading angle HA.

Although the invention has been shown and described with respect to certain embodiments, it is obvious that equivalent and obvious alterations and modifications will occur to others skilled in the art upon the reading and understanding of this specification. The present invention includes all such alterations and modifications and is limited only by the scope of the following claims.

What is claimed is:

1. A system for measuring a dynamic orientation of a plane of a wheel on a moving vehicle, said system comprising:

a test surface which rotates with the wheel when the vehicle is being driven and which is positioned in a plane corresponding to the plane of the wheel; and an orientation-determining device unattached to the vehicle which determines the orientation of the plane of the test surface at a specific point of time while the vehicle is being driven;

wherein the orientation-determining device comprises at least three transducers which emit respective beams of electromagnetic energy to three non-collinear points on the test surface and which detect respective beams reflected off of the test surface.

2. A system as set forth in claim 1, further comprising a processor which receives the signals from the orientation-determining device and converts the signals into output data corresponding to the orientation of the plane of the wheel for a specific point in time.

3. A system as set forth in claim 1, wherein the orientation-determining device is stationary.

4. A system as set forth in claim 1, wherein the orientation-determining device emits beams of energy onto the test surface.

5. A system as set forth in claim 1, wherein the transducers emit laser beams.

6. A method of measuring the dynamic orientation of the plane of a wheel on a moving vehicle with the system of claim 1, said method comprising the step of driving the vehicle past the orientation-determining device and activating the orientation-determining device to obtain data indicative of the orientation of the plane of the test surface.

7. A method for measuring the dynamic orientation of the plane of a wheel on a vehicle, said method comprising:

providing a test surface which rotates with the wheel when the vehicle is being driven and which is positioned in a plane corresponding to the plane of the wheel;

driving the vehicle; and determining, with an orientation-determining device unattached to the vehicle, the orientation of the plane of the test surface at a specific point of time while the vehicle is being driven;

wherein the orientation-determining device comprises at least three transducers which emit respective beams of electromagnetic energy to three non-collinear points on the test surface and which detect respective beams reflected off of the test surface.

8. A method as set forth in claim 7, wherein said providing step comprises securing a test disk to a hub of the wheel.

9. A method as set forth in claim 7, wherein said determining step is performed while the orientation-determining device is stationary.

10. A combination comprising the system of claim 1 and a vehicle including the wheel with which the test surface rotates.

11. A combination as set forth in claim 10, wherein the test surface is a disk secured to a hub of the wheel.

12. A system for measuring an inclination angle of a wheel on a moving vehicle, said system comprising:

a test surface which rotates with the wheel when the vehicle is being driven and which is positioned in at an angle corresponding to the angle of the wheel; and a device unattached to the vehicle which determines the inclination angle of the test surface at a specific point of time while the vehicle is being driven;

wherein the device comprises at least three transducers which emit respective beams of electromagnetic energy to three non-collinear points on the test surface and which detect respective beams reflected off of the test surface.

13. A system for measuring an inclination angle and a heading angle of a wheel on a moving vehicle, said system comprising:

a test surface which rotates with the wheel when the vehicle is being driven and which is positioned in a plane corresponding to the plane of the wheel; and an orientation-determining device unattached to the vehicle which determines the inclination angle and the heading angle of the test surface at a specific point of time while the vehicle is being driven;

wherein the device comprises at least three transducers which emit respective beams of electromagnetic energy to three non-collinear points on the test surface and which detect respective beams reflected off of the test surface.

* * * * *